United States Patent
Uchino et al.

(10) Patent No.: US 10,555,272 B2
(45) Date of Patent: Feb. 4, 2020

(54) MOBILE STATION FOR NOTIFYING TIMING ADJUSTMENT CAPABILITIES

(71) Applicant: NTT DOCOMO, INC., Tokyo (JP)

(72) Inventors: Tooru Uchino, Tokyo (JP); Hideaki Takahashi, Tokyo (JP); Yuta Sagae, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/394,743

(22) PCT Filed: Apr. 16, 2013

(86) PCT No.: PCT/JP2013/061260
§ 371 (c)(1),
(2) Date: Oct. 16, 2014

(87) PCT Pub. No.: WO2013/157536
PCT Pub. Date: Oct. 24, 2013

(65) Prior Publication Data
US 2015/0103741 A1    Apr. 16, 2015

(30) Foreign Application Priority Data
Apr. 20, 2012 (JP) .................................. 2012-096793

(51) Int. Cl.
*H04W 56/00* (2009.01)
*H04W 76/15* (2018.01)

(52) U.S. Cl.
CPC ........ *H04W 56/0045* (2013.01); *H04W 76/15* (2018.02)

(58) Field of Classification Search
CPC .......... H04W 56/0045; H04W 76/025; H04W 24/02; H04L 5/001
See application file for complete search history.

(56) References Cited

U.S. PATENT DOCUMENTS

| | | | |
|---|---|---|---|
| 2012/0008600 A1* | 1/2012 | Marinier | H04L 5/001 370/336 |
| 2013/0051288 A1* | 2/2013 | Yamada | H04W 8/24 370/280 |

(Continued)

FOREIGN PATENT DOCUMENTS

| | | |
|---|---|---|
| CN | 102291711 A | 12/2011 |
| JP | 5302438 B1 | 10/2013 |
| WO | 2011085200 A1 | 7/2011 |

OTHER PUBLICATIONS

International Search Report for corresponding International Application No. PCT/JP2013/061260, dated May 21, 2013 (1 page).

(Continued)

*Primary Examiner* — Jackie Zuniga Abad
(74) *Attorney, Agent, or Firm* — Osha Liang LLP

(57) ABSTRACT

A mobile station UE according to the present invention includes: a managing unit 11 configured to manage one or multiple TAGs each including any of a Pcell and an Scell; an adjusting unit 12 configured to adjust the transmission timings of uplink signals in any of the Pcell and the Scell belonging to the same TAG such that the transmission timings will be the same; and a transmitting unit 13 configured to notify a radio base station eNB of the supportable number of TAGs.

1 Claim, 5 Drawing Sheets

(56) References Cited

U.S. PATENT DOCUMENTS

| | | | |
|---|---|---|---|
| 2013/0188619 A1* | 7/2013 | Dinan | H04W 56/0005 370/336 |
| 2014/0140318 A1* | 5/2014 | Uemura | H04W 72/048 370/330 |
| 2014/0219170 A1 | 8/2014 | Zhao et al. | |
| 2015/0103741 A1 | 4/2015 | Uchino et al. | |

OTHER PUBLICATIONS

Written Opinion for corresponding International Application No. PCT/JP2013/061260, dated May 21, 2013 (3 pages).
Rapporteur (Nokia Corporation); "Updates of Carrier Aggregation agreements;" 3GPP TSG-WG2 Meeting #76, R2-116503; San Francisco, USA; Nov. 14-18, 2011 (4 pages).
Alcatel-Lucent et al.; "Multiple Timing Advances for Carrier Aggregation;" 3GPP TSG RAN WG1 Meeting #66bis, R1-113314; Zhuhai, China; Oct. 10-14, 2011 (4 pages).
InterDigital Communications; "Support for multiple Timing Advances in LTE CA;" 3GPP TSG-RAN WG2 #74, Tdoc R2-113255; Barcelona, Spain; May 9-13, 2011 (5 pages).
Search Report issued in corresponding European Application No. 13777721.5, dated Nov. 13, 2015 (7 pages).
CATT; "Consideration on Multi-TA Capability"; 3GPP TSG RAN WG2 Meeting #77bis, R2-121140; Jeju, Korea; Mar. 26-30, 2012 (1 page).
Catt; "Signaling for TAG configuration"; 3GPP TSG RAN WG2 Meeting #76, R2-115791; San Francisco, USA; Nov. 14-18, 2011 (4 page).
Office Action issued in corresponding Japanese Application No. 2016-162976, dated Sep. 5, 2017 (6 pages).
Office Action issued in the counterpart Chinese Patent Application No. 201380020869.6, dated Jul. 17, 2017 (17 pages).
Office Action issued in corresponding Japanese Application No. 2016-162976, dated Jan. 16, 2018 (4 pages).
Office Action issued in corresponding Chinese Application No. 201380020869.6, dated Dec. 28, 2017 (17 pages).
Office Action issued in the counterpart Chinese Patent Application No. 201380020869.6, dated Jun. 7, 2018 (14 pages).
Office Action issued in counterpart Chinese Patent Application No. 201380020869.6, dated Nov. 6, 2018 (11 pages).
Office Action issued in counterpart European Patent Application No. 13777721.5, dated Jan. 4, 2019 (7 pages).
Office Action issued in the counterpart Japanese Patent Application No. 2018078161, dated Mar. 26, 2019 (6 pages).
Office Action issued in the counterpart Chinese Patent Application No. 201380020869.6, dated May 10, 2019 (10 pages).

* cited by examiner

FIG. 3

UE-EUTRA-Capability information element

```
-- ASN1START

UE-EUTRA-Capability ::=      SEQUENCE {
    accessStratumRelease         AccessStratumRelease,
    ue-Category                  INTEGER (1..5),
    pdcp-Parameters              PDCP-Parameters,
    phyLayerParameters           PhyLayerParameters,
    rf-Parameters                RF-Parameters,
    measParameters               MeasParameters,
    featureGroupIndicators       BIT STRING (SIZE (32))           OPTIONAL,
    interRAT-Parameters    SEQUENCE {
        utraFDD                      IRAT-ParametersUTRA-FDD          OPTIONAL,
        utraTDD128                   IRAT-ParametersUTRA-TDD128                OPTIONAL,
        utraTDD384                   IRAT-ParametersUTRA-TDD384                OPTIONAL,
        utraTDD768                   IRAT-ParametersUTRA-TDD768                OPTIONAL,
        geran                        IRAT-ParametersGERAN                     OPTIONAL,
        cdma2000-HRPD                IRAT-ParametersCDMA2000-HRPD             OPTIONAL,
        cdma2000-1xRTT               IRAT-ParametersCDMA2000-1XRTT            OPTIONAL
    },
    nonCriticalExtension         UE-EUTRA-Capability-v920-IEs     OPTIONAL
}

...

UE-EUTRA-Capability-v11xy-IEs ::=    SEQUENCE {
    rf-Parameters-v11xy              RF-Parameters-v11xy              OPTIONAL,
    nonCriticalExtension             SEQUENCE {}                      OPTIONAL
}

...

UE-BasedNetwPerfMeasParameters-r10 ::= SEQUENCE {
    loggedMeasurementsIdle-r10       ENUMERATED {supported}   OPTIONAL,
    standaloneGNSS-Location-r10      ENUMERATED {supported}   OPTIONAL
}
```

| Example 1: UE-based TAG capability |
|---|

```
Rf-Parameters-v11xy ::=          SEQUENCE{
    supportedBandCombination-r11      SupportedBandCombination-r10
    supportedTAG-r11                              ENUMERATED{supported} OPTIONAL
}

-- ASN1STOP
```

FIG. 4

UE-EUTRA-Capability information element

```
-- ASN1START

UE-EUTRA-Capability ::=     SEQUENCE {
    accessStratumRelease        AccessStratumRelease,
    ue-Category                 INTEGER (1..5),
    pdcp-Parameters             PDCP-Parameters,
    phyLayerParameters          PhyLayerParameters,
    rf-Parameters               RF-Parameters,
    measParameters              MeasParameters,
    featureGroupIndicators      BIT STRING (SIZE (32))          OPTIONAL,
    interRAT-Parameters     SEQUENCE {
        utraFDD                     IRAT-ParametersUTRA-FDD         OPTIONAL,
        utraTDD128                  IRAT-ParametersUTRA-TDD128                  OPTIONAL,
        utraTDD384                  IRAT-ParametersUTRA-TDD384                  OPTIONAL,
        utraTDD768                  IRAT-ParametersUTRA-TDD768                  OPTIONAL,
        geran                       IRAT-ParametersGERAN                        OPTIONAL,
        cdma2000-HRPD               IRAT-ParametersCDMA2000-HRPD                OPTIONAL,
        cdma2000-1xRTT              IRAT-ParametersCDMA2000-1XRTT               OPTIONAL
    },
    nonCriticalExtension        UE-EUTRA-Capability-v920-IEs    OPTIONAL
}

...

UE-EUTRA-Capability-v11xy-IEs ::=   SEQUENCE {
    rf-Parameters-v11xy             RF-Parameters-v11xy                 OPTIONAL,
    nonCriticalExtension            SEQUENCE {}                         OPTIONAL
}

...

UE-BasedNetwPerfMeasParameters-r10 ::= SEQUENCE {
    loggedMeasurementsIdle-r10      ENUMERATED {supported}  OPTIONAL,
    standaloneGNSS-Location-r10     ENUMERATED {supported}  OPTIONAL
}

Example 2: Band combination-based TAG capability

Rf-Parameters-v11xy ::=             SEQUENCE{
    supportedBandCombination-r11        SupportedBandCombination-r11
}

SupportedBandCombination-r11 ::= SEQUENCE (SIZE ()) OF SupportedBandCombinationParameters-11

SupportedBandCombinationParameters-r11 ::= SEQUENCE {
    bandCominationParameter-r10     BandCombinationParameters-r10
    supportedTAG-r11                ENUMERATED{supported}   OPTIONAL
}

-- ASN1STOP
```

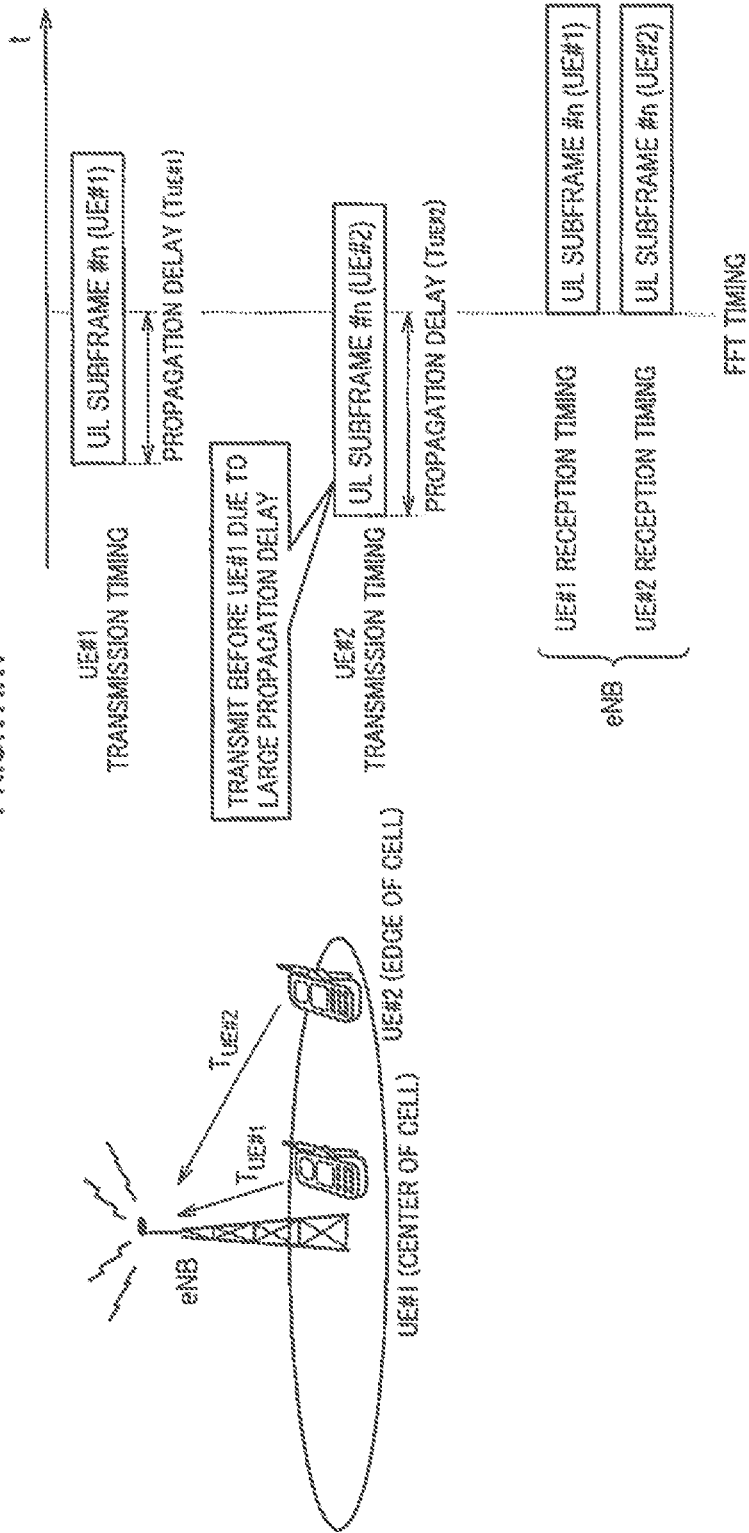

MOBILE STATION FOR NOTIFYING TIMING ADJUSTMENT CAPABILITIES

TECHNICAL FIELD

The present invention relates to a mobile station.

BACKGROUND ART

A mobile communication system supporting an LTE (Long Term Evolution) scheme is capable of performing CA (Carrier Aggregation) by using a Pcell (Primary Cell) which is a serving cell in a PCC (Primary Component Carrier) and an Scell (Secondary Cell) which is a serving cell in an SCC (Secondary Component Carrier).

Moreover, the mobile communication system supporting the LTE-Advanced scheme is configured to perform TA (Timing Advance) control.

Specifically, as shown in FIG. 5, in the TA control, a radio base station eNB is configured to specify a TA value for each of mobile stations UE #1 and UE #2 while the mobile stations UE #1 and UE #2 are configured to adjust the transmission timings of their uplink signals on the basis of their specified TA values so that the reception timings (EFT timings) at which the radio base station eNB receives the signals from the multiple mobile stations UE #1 and UE #2 can be the same.

For example, as shown in FIG. 5, the radio base station eNB causes the mobile station UE #2 located at the edge of a cell to transmit its uplink signal at a timing earlier than that of the mobile station UE #1 located at the center of the cell.

Meanwhile, in a case of performing Inter-band CA (UL CA) with cells of different frequencies, the cells differ from each other in radio characteristics (delay characteristics and attenuation characteristics). Thus, for the cells having different radio characteristics, it is necessary to perform TA control in a suitable manner for each of the radio characteristics.

Specifically, as shown in FIG. 6, in a case of performing Inter-band CA in a mobile communication system supporting the LTE-Advanced scheme, a Pcell and Scells #1 to #3 are grouped into groups of equivalent radio characteristics (TAGs: Timing Adjustment Groups), and TA control is performed on a group basis.

This TA control is called "Multiple Timing Advances (MTA) control."

Note that these groups include two types of groups—a pTAG including the Pcell (TAG-A in the example of FIG. 6) and an sTAG including only Scells (TAG-B in the example of FIG. 6).

PRIOR ART DOCUMENT

Non-Patent Document

Non-patent document 1: 3GPP Contribution R2-116503

SUMMARY OF THE INVENTION

Here, in a case of performing CA, the mobile stations UE differ from each other in the number of CCs they can use, and therefore the mobile stations UE differ from each other in the number of TAGs which can be set thereto as well.

For example, in a case of performing UL CA in which a mobile station UE uses three CCs of different bands, a different TAG is expected to be set for each of the three CCs.

At present, however, a mobile station UE can notify its radio base station eNB of the number of CC the mobile station UE can support, but cannot notify of the number of TAGs the mobile station UE can support.

Thus, if the radio base station eNB does not know the number of TAGs each mobile station UE can support, there will be a problem in that the radio base station UE cannot set appropriate mapping of CCs and TAGs for each mobile station UE.

For example, if the radio base station eNB uses an equal or greater number of TAGs than the number of TAGs a mobile station UE can support to control Inter-band CA by the mobile station UE, there will be a problem in that IOT (Inter Operability Test) cannot be guaranteed between the radio base station eNB and the mobile station UE.

Thus, the present invention has been made in view of the above-mentioned problem, and an object thereof is to provide a mobile station capable of setting appropriate mapping of CCs and TAGs in a case of performing Inter-band CA.

A first feature of the present invention is summarized as a mobile station used in a mobile communication system configured to be capable of performing carrier aggregation by using a primary cell and a secondary cell, including: a managing unit configured to manage one or a plurality of timing adjustment groups each including any of a primary cell and a secondary cell; an adjusting unit configured to adjust transmission timings of uplink signals in any of the primary cell and the secondary cell belonging to the same timing adjustment group such that the transmission timings becomes the same; and a transmitting unit configured to notify a radio base station of a supportable number of timing adjustment groups.

A second feature of the present invention is summarized as a mobile station used in a mobile communication system configured to be capable of performing carrier aggregation by using a primary cell and a secondary cell, including: a managing unit configured to manage one or a plurality of timing adjustment groups each including any of a primary cell and a secondary cell; and an adjusting unit configured to adjust transmission timings of uplink signals any of in the primary cell and the secondary cell belonging to the same timing adjustment group such that the transmission timings becomes the same. Here, a supportable number of timing adjustment groups is set equal to or greater than a supportable number of bands.

BRIEF DESCRIPTION OF THE DRAWINGS

FIG. 3 is a diagram showing an example of an information element "UE-EUTRA-Capability" to be transmitted by the mobile station according to the first embodiment of the present invention.

FIG. 4 is a diagram showing an example of the information element "UE-EUTRA-Capability" to be transmitted by the mobile station according to the first embodiment of the present invention.

FIG. 5 is a diagram for describing a conventional mobile communication system.

MODE FOR CARRYING OUT THE INVENTION (Mobile Communication System According to First Embodiment of Present Invention)

A mobile communication system according to a first embodiment of the present invention will be described with reference to FIGS. 1 to 4.

The mobile communication system according to this embodiment supports an LTE-Advanced scheme and is configured to be capable of performing CA by using a Pcell and an Scell.

Specifically, the mobile communication system according to this embodiment is configured to be capable of performing "Inter-band CA."

Figure 1:
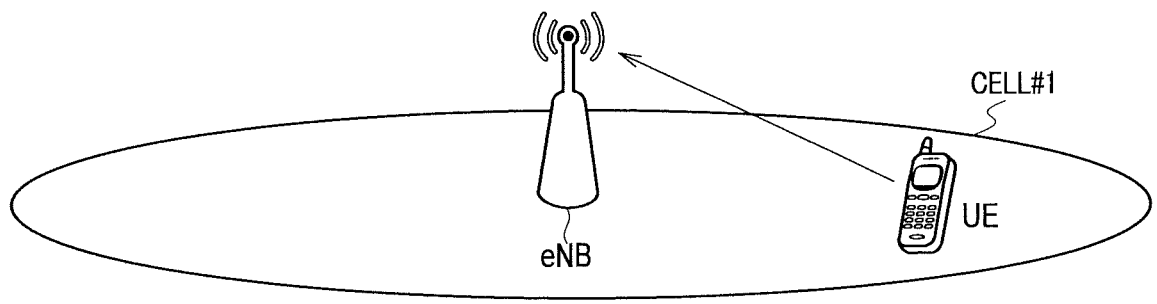
FIG. 1 is an overall configurational view of a mobile communication system according to a first embodiment of the present invention.

As shown in FIG. 1, the mobile communication system according to this embodiment includes a radio base station eNB configured to manage a cell #1.

Figure 2:
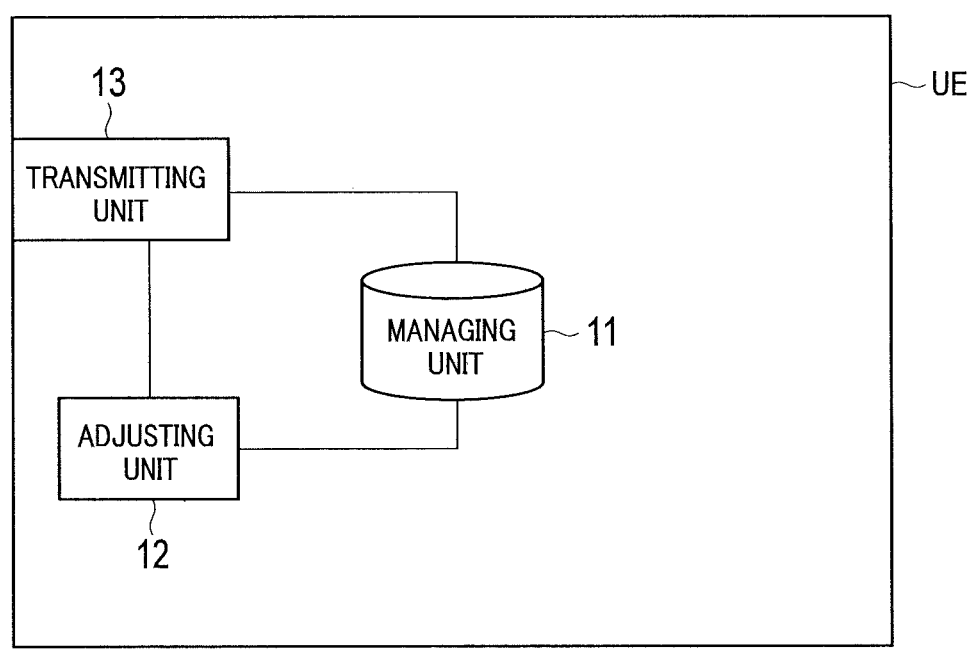
FIG. 2 is a functional block diagram of a mobile station according to the first embodiment of the present invention.
Figure 6:
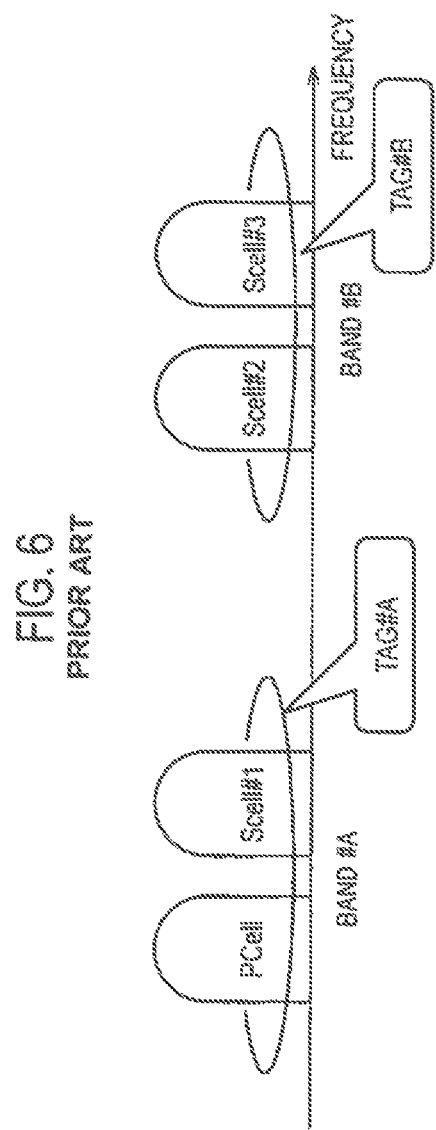
FIG. 6 is a diagram for describing a conventional mobile communication system.

As shown in FIG. 2, a mobile station UE according to this embodiment includes a managing unit 11, an adjusting unit 12, and a transmitting unit 13.

The managing unit 11 is configured to manage one or multiple TAGs each including a Pcell or an Scell, i.e. a pTAG and an sTAG.

Specifically, the managing unit 11 is configured to manage serving cells (or CCs) belonging to the pTAG and the sTAG.

The adjusting unit 12 is configured to perform MTA control. Specifically, the adjusting unit 12 is configured to adjust the transmission timings of uplink signals in any of the Pcell and the Scell belonging to the same TAG such that the transmission timings will be the same.

The transmitting unit 13 is configured to transmit various types of signals to the radio base station eNB.

For example, the transmitting unit 13 is configured to notify the radio base station eNB of the supportable number of TAGs.

Here, as shown in FIG. 3, the transmitting unit 13 may be configured to add a new information element "supportedTAG-r11" to an information element "UE-EUTRA-Capability" specified in 3GPP TS36.331 and use this information element "supportedTAG-r11" to notify the radio base station eNB of the number of TAGs the mobile station UE can support.

Moreover, as shown in FIG. 4, the transmitting unit 13 may be configured to add the new information element "supportedTAG-r11" to the information element "UE-EUTRA-Capability" specified in 3GPP TS36.331 and notify of the supportable number of TAGs for each band combination in CA.

Alternatively, the transmitting unit 13 may be configured to notify of the maximum or minimum supportable number of TAGs.

Moreover, the transmitting unit 13 may be configured to notify of the supportable number of TAGs for each radio function (e.g. the antenna, transmitter, and receiver).

Alternatively, the transmitting unit 13 may be configured to notify of the maximum or minimum supportable number of TAGs for each radio function (e.g. the antenna, transmitter, and receiver).

Moreover, the transmitting unit 13 may be configured to notify of the supportable number of TAGs for each band.

Alternatively, the transmitting unit 13 may be configured to notify of the maximum or minimum supportable number of TAGs for each band.

Note that as in the case of using the above-mentioned information element "UE-EUTRA-Capability," the transmitting unit 13 may be configured to notify of the supportable number of TAGs at the RRC (Radio Resource Control) layer, or to notify of the supportable number of TAGs at the PDCP (Packet Data Convergence Protocol) layer, the RLC (Radio Link Control) layer, the MAC (Media Access Control) layer, or the physical layer.

According to the invention according to this embodiment, the radio base station eNB can set appropriate mapping of CCs and TAGs for each mobile station UE on the basis of the supportable number of TAGs notified by each mobile station UE.

Moreover, the supportable number of TAGs may be set equal to or greater than the number of connectable cells (or radio base stations eNB or bands) in coordinated multi-point transmission/reception (CoMP).

Moreover, the supportable number of TAGs may be included in a notification of the connectable number of cells (or radio base stations or bands) in coordinated multi-point transmission/reception.

For example, with the number of supportable TAGs notified of from the mobile station UE, the radio base station eNB can avoid a situation where it uses an equal or greater number of TAGs than the number of TAGs the mobile station UE can support to control Inter-band CA by the mobile station UE.

(Modification 1)

Hereinbelow, a mobile communication system according Modification 1 of the present invention will be described by focusing on its differences from the mobile communication system according the first embodiment described above.

In the mobile communication system according to Modification 1, the transmitting unit 13 may be configured to notify of the supportable number of TAGs by notifying of "SupportedBandCombination-r10."

Specifically, in the mobile communication system according to Modification 1, the definition of an information element "SupportedBandCombination-r10" in the information element "UE-EUTRA-Capability" specified in 3GPP TS36.331 is changed such that this "SupportedBandCombination-r10" indicates not only the supportable number of bands but also the supportable number of TAGs.

More specifically, the "SupportedBandCombination-r10" is defined (configured) to notify the numbers of bands and CCs (Component Carriers) the mobile station UE supports. Thus, if, for example, the number of TAGs the mobile station UE supports is uniquely determined by the supportable numbers of bands and CCs (if the "SupportedBandCombination-r10" is defined in such a way), the number of TAGs the mobile station UE supports can be implicitly notified of by notifying of the numbers of bands and CCs the mobile station UE supports.

In this case, the number of TAGs the mobile station UE can support is set equal to or greater than the number of bands the mobile station UE can support.

Moreover, the supportable number of TAGs may be set equal to or greater than the number of connectable cells (or radio base stations eNB or bands) in coordinated multi-point transmission/reception.

Moreover, the supportable number of TAGs may be included in a notification of the number of connectable cells (or radio base stations or bands) in coordinated multi-point transmission/reception.

According to the mobile communication system according to this Modification 1, the radio base station eNB can control Inter-band CA by the mobile station UE by using the number of TAGs indicated by the "SupportedBandCombination-r10."

The above-described features of the embodiment may also be expressed as follows.

A first feature of this embodiment is summarized as a mobile station UE used in a mobile communication system configured to be capable of performing CA by using a Pcell (primary cell) and a Scell (secondary cell), including: a managing unit 11 configured to manage one or multiple TAGs (timing adjustment groups) each including any of a Pcell and a Scell; an adjusting unit 12 configured to adjust transmission timings of uplink signals in any of the Pcell and the Scell belonging to the same TAG such that the transmission timings becomes the same; and a transmitting unit 13 configured to notify a radio base station eNB of a supportable number of TAGs.

In the first feature of this embodiment, the transmitting unit 13 may be configured to notify of the supportable number of TAGs for each band combination in CA.

In the first feature of the present embodiment, the transmitting unit 13 may be configured to notify of the supportable number of TAGs for each radio function.

In the first feature of this embodiment, the transmitting unit 13 may be configured to notify of the supportable number of TAGs for each band.

In the first feature of this embodiment, the transmitting unit 13 may be configured to notify of the supportable number of TAGs by notifying of a "SupportedBandCombination-r10 (supportable number of bands)."

A second feature of this embodiment is summarized as a mobile station UE used in a mobile communication system configured to be capable of performing CA by using a Pcell and a Scell, including: a managing unit 11 configured to manage one or multiple TAGs each including any of a Pcell and a Scell; and an adjusting unit 12 configured to adjust transmission timings of uplink signals any of in the Pcell and the Scell belonging to the same TAG such that the transmission timings becomes the same. Here, a supportable number of TAGs is set equal to or greater than a supportable number of bands.

It should be noted that the foregoing operations of the mobile station UE and the radio base station eNB may be implemented by hardware, may be implemented by a software module executed by a processor, or may be implemented in combination of the two.

The software module may be provided in a storage medium in any format, such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or CD-ROM.

The storage medium is connected to a processor so that the processor can read and write information from and to the storage medium. Instead, the storage medium may be integrated in a processor. The storage medium and the processor may be provided inside an ASIC. Such an ASIC may be provided in the mobile station UE and the radio base station eNB. Otherwise, the storage medium and the processor may be provided as discrete components inside the mobile station UE and the radio base station eNB.

Hereinabove, the present invention has been described in detail by use of the foregoing embodiments. However, it is apparent to those skilled in the art that the present invention should not be limited to the embodiments described in the specification. The present invention can be implemented as an altered or modified embodiment without departing from the spirit and scope of the present invention, which are determined by the description of the scope of claims. Therefore, the description of the specification is intended for illustrative explanation only and does not impose any limited interpretation on the present invention.

Note that the entire content of Japanese Patent Application No. 2012-096793 (filed on Apr. 20, 2012) is incorporated by reference in the present specification.

INDUSTRIAL APPLICABILITY

As described above, according to the present invention, it is possible to provide a mobile station capable of setting appropriate mapping of CCs and TAGs in a case of performing Inter-band CA.

EXPLANATION OF THE REFERENCE NUMERALS

UE mobile station
eNB radio base station
11 managing unit
12 adjusting unit
13 transmitting unit

The invention claimed is:
1. A mobile station, comprising:
a processor; and a transmitter, wherein:
the mobile station is used in a mobile communication system configured to be capable of performing inter-band carrier aggregation by using a primary cell and a secondary cell;
the mobile communication system has one or a plurality of timing adjustment groups each including any of a primary cell and a secondary cell;
the processor adjusts transmission timings of uplink signals in any of the primary cell and the secondary cell belonging to the same timing adjustment group such that the transmission timings becomes the same; and
the transmitter notifies a radio base station of a supportable number of timing adjustment groups that the mobile station can support,
wherein the transmitter notifies the supportable number of timing adjustment groups for each band combination in the inter-band carrier aggregation.

* * * * *